United States Patent [19]
Garrett et al.

[11] 4,256,575
[45] Mar. 17, 1981

[54] APPARATUS AND METHOD FOR TREATMENT OF LIQUIDS

[76] Inventors: Michael E. Garrett, 92 York Rd., Woking; Oliver A. Kite, 22 Hayes Close, West Wickham, both of England

[21] Appl. No.: 44,348

[22] Filed: May 31, 1979

[30] Foreign Application Priority Data

May 31, 1978 [GB] United Kingdom ............ 24994/78

[51] Int. Cl.³ ............................................. C02F 3/22
[52] U.S. Cl. ................................ 210/629; 210/195.3; 210/601; 261/29
[58] Field of Search ......................................... 210/3–7, 210/14–15, 194–198, 205–208, 218–221, 320; 261/29, 36 R, 93, DIG. 75

[56] References Cited

U.S. PATENT DOCUMENTS 3,804,255  4/1974  Speece ............................. 210/194
3,807,565  4/1974  Langston et al.
4,000,227  12/1976  Garrett ......................... 261/DIG. 75
4,043,771  8/1977  Anand .......................... 261/DIG. 75
4,054,524  10/1977  Mackrle et al. ..................... 210/220

Primary Examiner—Benoit Castel
Attorney, Agent, or Firm—Dennison, Meserole, Pollack & Scheiner

[57] ABSTRACT

An apparatus and method for treating aqueous waste material having a biochemical oxygen demand comprises a method utilizing a vessel in which a volume of waste material establishes itself into an upper zone of clarified waste material and a lower zone of liquid containing bacterial sludge. Liquid from the lower zone is mixed with incoming sewage and the resulting mixture is fed first to an oxygenation chamber and then to a stilling chamber located in the upper zone of the vessel. Baffle means is located within the vessel for deflecting and reducing the momentum of the aqueous waste material as it leaves the stilling box and falls to the lower zone.

3 Claims, 3 Drawing Figures

APPARATUS AND METHOD FOR TREATMENT OF LIQUIDS

FIELD OF THE INVENTION

The present invention relates to an apparatus and method for treating aqueous waste material having a biochemical oxygen demand.

BACKGROUND OF THE INVENTION

An apparatus for treating aqueous waste material having a biochemical oxygen demand is described in U.S. Pat. application Ser. No. 874 700 filed on Feb. 2, 1978 and comprises a vessel for containing a volume of the material; means for continuously advancing a stream of the aqueous waste material through a passage in communication with a confined stilling zone of the vessel spaced above the bottom of the vessel; means for combining with the said stream a stream of aqueous liquor containing bacterial sludge; baffle means defining said stilling zone and keeping liquor within it separate from an upper layer of clarified liquor which in operation of the apparatus surrounds the stilling zone and from which, in operation of the apparatus, clarified liquid is withdrawn; means for introducing the streams into the stilling zone such that, in operation of the apparatus the momentum of the liquid is substantially reduced before the liquid passes to a lower zone of the vessel in which, in operation of the apparatus, biological treatment of the aqueous material takes place and which contains the bacterial sludge; means for introducing oxygen or oxygen containing gas mixture into the combined stream so as to form discrete bubbles of oxygen gas therein and thereby facilitate dissolution of the oxygen; and means for recycling aqueous material containing bacterial sludge from the liquor in the lower zone and for forming the aforesaid continuously advancing stream of aqueous liquor containing bacterial sludge.

During the development of the above defined apparatus it was noticed that the momentum of the recirculating liquor, particularly in apparatus treating strong effluents with high recirculation rates, persisted and caused difficulties in maintaining a satisfactory clarified liquid zone within the vessel.

OBJECTS OF THE INVENTION

It is an object of the present invention to provide an apparatus and method for treating aqueous waste material having a biochemical oxygen demand which includes means for reducing the momentum of the recirculating liquor.

It is a further object of the present invention to provide means for directing moving streams of liquor such that the mixing of the aqueous waste material at a lower zone of a vessel is enhanced whilst the disturbance of the clarified aqueous waste material at an upper zone of the vessel is reduced.

SUMMARY OF THE INVENTION

According to the present invention, an apparatus for carrying forth a method for treating aqueous waste material having a biochemical oxygen demand comprises a vessel for containing a quantity of the aqueous waste material at a lower zone in the vessel, a stilling box located within the vessel at an upper zone above the said lower zone which stilling box, in operation of the apparatus, is suspended in a clarified aqueous waste material occupying said upper zone, an outlet at the lower end of the vessel, a pipeline for the passage of aqueous waste material therethrough extending from the outlet and terminating at a position within the stilling box, means for introducing oxygen or an oxygen containing gas into the aqueous waste material, means for withdrawing the aqueous waste material from the lower zone in the vessel, through the outlet and along the pipeline such that, in operation of the apparatus, oxygen is dissolved in the aqueous waste material which material is then discharged into the stilling box which reduces the momentum of the aqueous waste material so introduced before it falls to the lower zone of the vessel, baffle means located within the vessel for deflecting and reducing still further the momentum of the aqueous waste material as it leaves the stilling box and falls to the lower zone of the vessel and means at the upper zone for withdrawing clarified aqueous waste material from the vessel.

The baffle means included in the apparatus of the present invention defined above directs the moving streams of liquor such that the mixing of the aqueous waste material at the lower zone is enhanced whilst the disturbance of the clarified aqueous waste material at the upper zone is reduced.

DESCRIPTION OF THE DRAWINGS

Embodiments of the invention will now be described by way of example, reference being made to the figures of the accompanying diagrammatic drawings in which.

DESCRIPTION OF PREFERRED EMBODIMENTS

Figure 1:
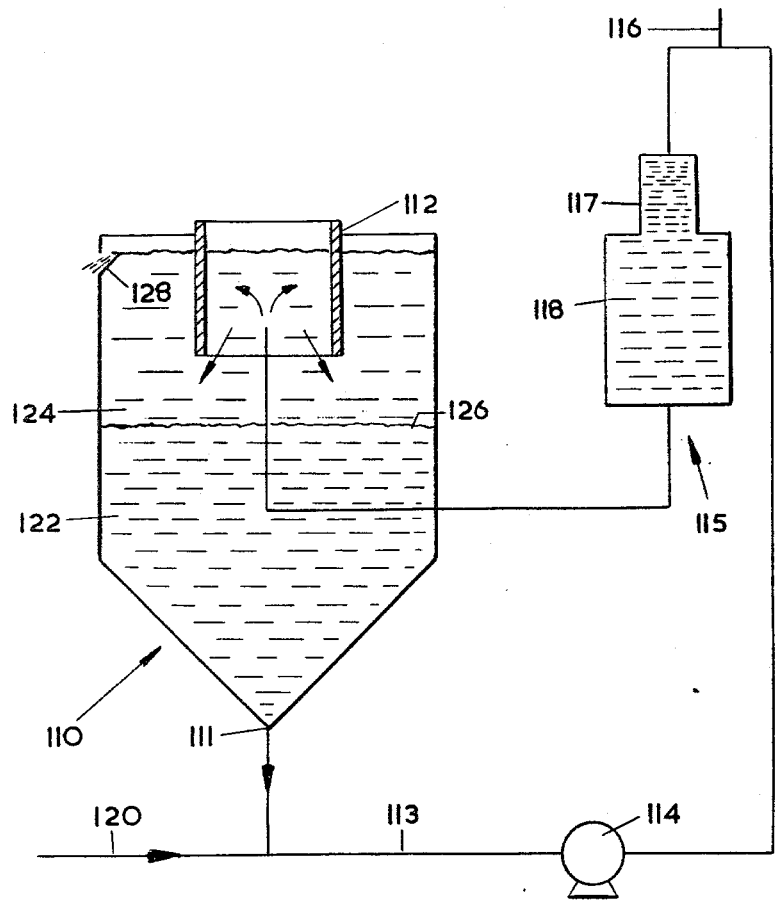
FIG. 1 is a diagrammatic representation of a sewage treatment apparatus and described in U.S. Pat. application Ser. No. 874 700.

Referring to FIG. 1, there is illustrated an apparatus for treating aqueous waste material having a biochemical oxygen demand as described in U.S. Pat. application Ser. No. 874,700. The apparatus comprises a vessel in the form of a treatment tank 110 having a sloped bottom leading to an outlet 111. An open ended tubular stilling box 112 is suspended in an upper zone 124 of the tank 110 normally occupied by a clarified aqueous waste material or liquor. A recirculation liquid pipeline 113 leads from an outlet 111 and a pump 114 in the line 113 withdraws a flocculent slurry containing bacterial sludge which settles towards the bottom of the tank 110 and circulates it at a pressure in the range of 3 to 20 ft water gauge through a gas/liquid contacting device 115 from which it passes into the sewage in the tank 110 at a position within the stilling box 112. Oxygen or oxygen rich gas, usually containing at least 30% and preferably 90% by volume of oxygen is passed into the liquid flowing through pipeline 113 through an oxygen supply pipeline 116. Additional feed for the bacteria in a form of liquid effluent is passed into the liquid line 113 through a conduit 120 which is connected to a supply of such feed.

Oxygen is introduced via the pipeline 116 at a rate to provide a quantity of dissolved oxygen in the liquid stream of 25 parts per million or more.

The contactor device 115 is substantially as described in U.S. Pat. application Ser. No. 874 700 and a liquid stream containing dissolved oxygen and small bubbles of undissolved gas passes into the tank 110.

The oxygenated liquid stream enters the volume of sewage in tank 110 within the stilling box 112 and its momentum is reduced in the volume of liquid contained in the stilling box. A relatively calm flow of oxygenated bacterial sludge, slightly denser than the clear aqueous waste material or liquor flows downwards out of the confines of the stilling box 112 into a lower treatment region 122 of the tank 110 without causing any substantial agitation of this region. The bacteria contained in the sludge in zone 122 utilises the oxygen to metabolize soluble organic materials contained in the liquid. Some treated liquor rises through the sludge into the zone 124 when further separation from bacteria and contains solids occurs. The zone 124 contains clear liquid. The boundary 126 between the zone 124 and the zone 122 is relatively pronounced.

As the oxygenated liquid enters the stilling box 112 so carbon dioxide rich gas tends to be released therefrom in the form of bubbles which rise to the surface of the liquid in the tank 110.

Clarified liquor is run off from the upper zone 124 of the tank over an outlet weir 128. Settled sludge at the bottom of the tank 110 is recycled through the pipeline 113 for further oxygenation.

The apparatus illustrated in FIG. 1 and described briefly above is perfectly adequate for normal usage. However, when used for treating strong effluents with high recirculation rates there is a tendency for the momentum of the recirculating waste material to persist and cause difficulties in maintaining a satisfactory upper clarification zone 124 within the tank 110.

Figure 2:
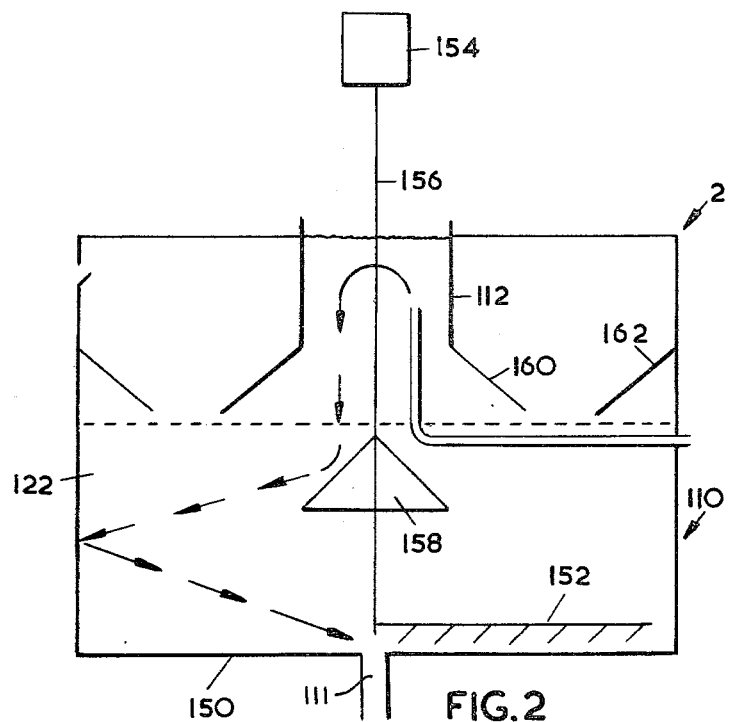
FIG. 2 is a diagrammatic representation of a modification of the apparatus of FIG. 1.

Referring now to FIG. 2, an apparatus 2 for treating aqueous waste material having a biochemical oxygen demand differs from the apparatus illustrated in FIG. 1 in the following particulars. The bottom 150 of tank 110 is generally flat and the tank contains a scraper 152 driven by a motor 154 through a scraper shaft 156 extending centrally through the stilling box 112. Furthermore, attached to the scraper shaft 156 is a first baffle means 158 and fixed to the stilling box 112 is a second baffle means in the form of a skirt 160. Attached to the side of the tank 110 immediately opposite the skirt 160 is a third baffle means in the form of a further skirt 162.

When the oxygenated liquid stream enters the volume of sewage in the tank 110 within the stilling box 112 its momentum is reduced but not destroyed and as a consequence liquor leaves the stilling box 112 in a generally downward direction and impinges against the first baffle means 158 which reduces the momentum of the liquor and deflects it towards the side of the tank 110. On engaging the wall of the tank 110 the liquor is again deflected towards the outlet 111 where it will enter the recycle stream. The skirts 160, 162 are provided to minimise the entrainment of the upper clear liquor with the moving stream.

It has been found that the baffle means 158 together with the skirts 160, 162 direct the moving stream of liquor such that mixing of the sludge in the lower zone 122 is enhanced and the disturbance of the upper zone of clear liquor is reduced.

Figure 3:
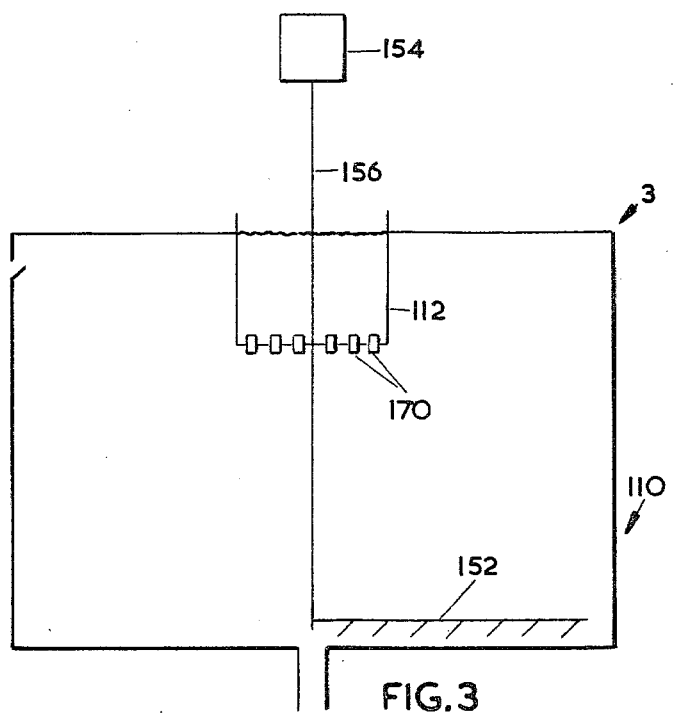
FIG. 3 is a diagrammatic representation of yet a further modification of the apparatus of FIG. 1.

Referring now to FIG. 3, an apparatus 3 for treating aqueous waste material having a biochemical oxygen demand is similar to the apparatus illustrated in FIG. 1 but differs in the following particulars. Mounted within the stilling box 112 adjacent the lower end of the stilling box are a plurality of "air stones" 170. Each air stone consists of a stiff tubular polythene member the interior of which is connected to a gas supply. When gas is supplied to the air stones 170 the bubbles diffuse through the material of the tubes and strip carbon dioxide from the oxygenated liquid stream entering the stilling box 112. The bubbles also destroy the momentum of the oxygenated liquid stream. It is preferred that the gas supplied to air stones is oxygen or oxygen rich gas.

It has been found that where recirculation rates of 25-1 or above are used then the modifications to the apparatus of FIG. 1 which have been described above and illustrated in FIGS. 2 and 3 increase the chances of maintaining a satisfactory upper clarification zone 124 within the tank 110.

We claim

1. An apparatus for treating aqueous waste material having a biochemical oxygen demand comprising a vessel for containing a quantity of the aqueous waste material at a lower zone in the vessel, means for reducing the momentum of aqueous waste material being introduced into the vessel and comprising a stilling box located within the vessel at an upper zone above the said lower zone, which stilling box, in operation of the apparatus, is suspended in a clarified aqueous waste material occupying the said upper zone, an outlet at the lower end of the vessel, means for feeding aqueous waste material through a conduit extending from the outlet to an aqueous waste material inlet within the stilling box, means for introducing oxygen or an oxygen containing gas into the aqueous waste material in the conduit whereby, in operation of the apparatus, aqueous waste material is withdrawn from the lower zone in the vessel, oxygen is dissolved in the aqueous waste material, which material is then discharged into the stilling box for reducing the momentum of the aqueous waste material before it falls to the lower zone of the vessel, means for reducing still further the momentum of aqueous material as it leaves the stilling box which comprises baffle means located within the vessel and at least interposed in the flow path of the aqueous waste material for at least laterally and downwardly deflecting the aqueous material as it leaves the stilling box and falls to the lower zone of the vessel, said baffle means including a first baffle device for deflecting the aqueous waste material as it leaves the stilling box towards a side of the vessel, a second baffle device attached to the lower end of the stilling box which together with a third baffle device attached to the walls of the vessel opposite the second baffle device inhibits the aqueous waste material from entering the upper zone of the vessel occupied by clarified aqueous waste material, whereby the mixing of the aqueous waste material in the lower zone of the vessel is enhanced while disturbance of clarified aqueous waste material in the upper zone is reduced and means for withdrawing clarified aqueous waste material from the upper zone of the vessel.

2. An apparatus as claimed in claim 1, in which the first baffle device is fixed to a scraper shaft extending through the stilling box and attached at one end to a scraper motor and at its opposite end within the vessel to a scraper and in which second baffle device is a skirt attached to the lower end of the stilling box and the third baffle device is a skirt attached to the wall of a vessel immediately opposite the skirt attached to the stilling box.

3. A process of treating aqueous waste material having a biochemical oxygen demand by generally concurrently subjecting the aqueous waste material to oxygenation, biological treatment and settling, comprising:

establishing a volume of the aqueous waste material in a treatment vessel as a body having a lower layer comprising a biological treatment zone which comprises a bacterial sludge-containing aqueous waste material and an upper layer comprising clarified aqueous waste material;

withdrawing aqueous bacterial sludge-containing aqueous waste material from the bottom of the lower layer and generally continuously mixing it with an incoming stream of aqueous waste material to be treated to form a mixed stream, oxygenating the mixed stream and introducing the oxygenated mixed stream so formed into a defined stilling zone located within the upper layer of clarified aqueous waste material;

passing the oxygenated mixed stream downwardly through the stilling zone with reduced momentum through at least a portion of the upper layer of clarified waste material;

laterally and downwardly deflecting the oxygenated mixed stream passing through said at least a portion of the upper layer of clarified aqueous waste material by providing baffle means within the treatment vessel which includes a first baffle device for deflecting the aqueous waste material as it leaves the stilling zone towards a side of the vessel, a second baffle device attached to the lower end of a box defining the stilling zone which together with a third baffle device attached to the walls of the vessel opposite the second baffle device inhibits the aqueous waste material from entering the upper layer of clarified aqueous waste material, whereby the mixing of the aqueous waste material in the lower zone of the vessel is enhanced while disturbance of clarified aqueous waste material in the upper zone is reduced; and withdrawing clarified aqueous liquor from the upper layer.

\* \* \* \* \*